United States Patent
Hwang et al.

(10) Patent No.: US 8,914,332 B2
(45) Date of Patent: *Dec. 16, 2014

(54) SYSTEM AND METHOD FOR AUTOMATIC DETECTION OF DUPLICATE DIGITAL PHOTOS

(71) Applicants: Sony Corporation, Tokyo (JP); Sony Electronics Inc., Park Ridge, NJ (US)

(72) Inventors: Paul Jin Hwang, Solana Beach, CA (US); Rachel Thuy Nguyen, San Jose, CA (US); Guoxuan Zhang, San Diego, CA (US); Jianyu Roy Zheng, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/900,909

(22) Filed: May 23, 2013

(65) Prior Publication Data

US 2013/0254167 A1 Sep. 26, 2013

Related U.S. Application Data

(63) Continuation of application No. 11/580,779, filed on Oct. 13, 2006, now Pat. No. 8,527,469.

(51) Int. Cl.
*G06F 17/30* (2006.01)
*G06F 11/14* (2006.01)

(52) U.S. Cl.
CPC ........ *G06F 17/3033* (2013.01); *G06F 17/3026* (2013.01); *G06F 11/1453* (2013.01)
USPC ....................................................... 707/668

(58) Field of Classification Search
CPC ............ G06F 17/301; G06F 17/30997; G06F 17/30247; G06F 17/30268
USPC ....................................................... 707/668
See application file for complete search history.

(56) References Cited

U.S. PATENT DOCUMENTS

| | | | |
|---|---|---|---|
| 6,961,463 B1* | 11/2005 | Loui et al. | 382/170 |
| 7,421,128 B2* | 9/2008 | Venkatesan et al. | 382/232 |
| 8,538,997 B2* | 9/2013 | Arrouye et al. | 707/799 |
| 2005/0144455 A1* | 6/2005 | Haitsma | 713/176 |
| 2007/0180265 A1* | 8/2007 | Hiroshi | 713/187 |

* cited by examiner

*Primary Examiner* — Sheree Brown
(74) *Attorney, Agent, or Firm* — John L. Rogitz

(57) ABSTRACT

Hashes of metadata of digital photographs on, e.g., a removable camera memory are compared against values in a hash table representing previously stored photographs on an archive computer to ensure that only previously unstored photos are copied onto the archive computer.

15 Claims, 1 Drawing Sheet

SYSTEM AND METHOD FOR AUTOMATIC DETECTION OF DUPLICATE DIGITAL PHOTOS

I. FIELD OF THE INVENTION

The present invention relates generally to detecting duplicate photographs to conserve storage space.

II. BACKGROUND OF THE INVENTION

The computer-stored files representing digital photographs imaged by a digital camera can be transferred to a user's computer to facilitate a number of advantages, including not only archiving but also viewing, printing, editing, and grouping the photographs into albums. As used herein, "user computer" encompasses not only personal computers and the like but also dedicated computerized storage devices such as the so-called "digital shoebox."

Apart from the advantages afforded by transferring digital photographs to a user computer and apart from the mode in which the transfer is effected, as recognized herein it is possible for a person to unintentionally transfer the same photograph twice into the storage of the computer. Specifically, as recognized herein redundant copies of the same photo can be stored on a computer when a memory card, flash drive, or other typically camera-compatible memory is engaged with the computer to transfer photos thereto, since the memory card may then be subsequently reengaged with the camera, more pictures taken, and then the memory card reengaged with the computer in an effort to archive the new photos with the old photos still on the memory card and, thus, potentially redundantly copied back onto the computer as part of, e.g., an automatic archive function. Such redundant copying wastes storage space.

SUMMARY OF THE INVENTION

A method for storing, onto a first computer storage, digital photo files on a second computer storage includes, for at least one photo file (and preferably for all photo files) sought to be stored, accessing metadata of the file. The method compares the metadata or a hash thereof with data in a data structure representing photo files that have been previously stored onto the first computer storage to determine whether to store the photo file onto the first computer storage.

In a preferred implementation of this aspect a hash of metadata is compared to data in the data structure, and the data structure is a hash table. The hash can be a hash of file name, file size, and predetermined EXIF data. In any case, if the hash of metadata associated with the photo file sought to be stored matches a value in the hash table, the photo file is not copied onto the first computer storage. In contrast, if the hash of metadata associated with the photo file sought to be stored does not match a value in the hash table, the photo file is copied onto the first computer storage and the hash of metadata associated with the photo file sought to be stored is added to the hash table.

Non-limiting EXIF data can include camera model name and/or shooting date/time and/or shooting mode and/or photo effect and/or shutter speed and/or aperture value and/or light metering and/or exposure compensation and/or ISO speed and/or lens type and/or focal length and/or whether zoom was used and/or IS mode and/or image size and/or image quality and/or and whether a flash was used and if so what type.

In another aspect, an apparatus for storing digital photo files includes a first computer storage, and a processor accessing a second computer storage to compare hash values of metadata associated with photo files on the second computer storage with values in a hash table. The processor determines whether to store each photo file onto the first computer storage at least partially based on the comparison.

In still another aspect, a computer readable medium bears instructions that can be executed by a computer processor to compare hashes of metadata of digital photographs against values in a hash table representing previously stored photographs on an archive data store to ensure that only previously unstored photos are copied onto the archive data store.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
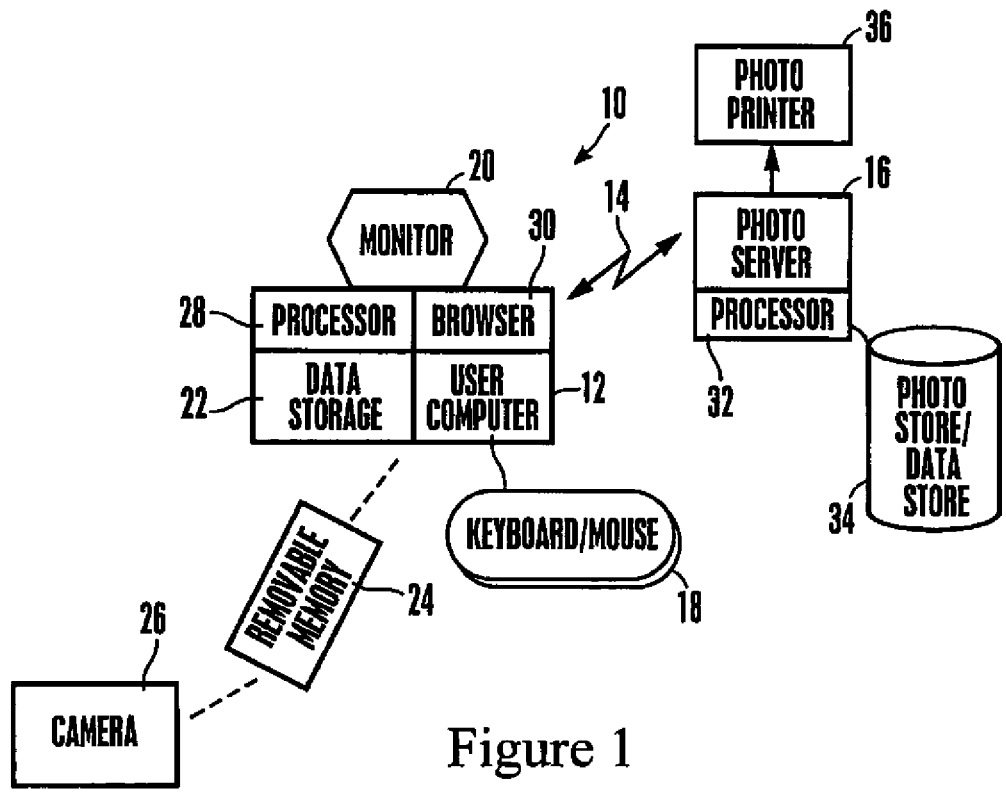
FIG. 1 is a block diagram of a non-limiting system that can be used to implement the invention.

Referring initially to FIG. 1, a system is shown, generally designated 10, that includes a user computer 12, such as but not limited to a personal computer, laptop computer, notebook computer, etc. or a dedicated computerized storage device such as a so-called "digital shoebox" that may if desired communicate over the Internet 14 or other wide area network with a server 16, although Internet communication is not necessarily central to the present invention. In typical non-limiting implementations the user computer 12 includes data entry devices 18 such as keyboards, mice, etc. and data output devices such as a monitor 20.

Additionally, the user computer 12 can include a local internal or external data store 22 such as but not limited to hard disk drive, optical disk drive, alone or in combination with solid state memory, etc. Digital photographs may be stored in the local data store 22. Also, the computer 12 may be engageable with a removable memory 24 such as but not limited a Sony Memory Stick® that may also bear digital photographs taken by a camera 26 with which the removable memory 24 can be engaged. A user computer processor 28 can execute logic stored in local memory to execute various steps described further below.

The camera 26 typically stores a digital photograph in file form, appending metadata to the file known as "Exchangeable Image File" (EXIF) data. In one non-limiting implementation, the EXIF data may include but may not be limited to file name, camera model name, shooting date/time, shooting mode, photo effect, shutter speed, aperture value, light metering, exposure compensation, ISO speed, lens type, focal length, whether zoom was used, IS mode, image size, image quality, and whether a flash was used and if so what type. Additional metadata that can be appended to a photo file either by the camera 26 or by the processor 28 can include the file size.

Completing the description of FIG. 1, the server 16 includes a server processor 32 that can access a server store 34, and the server store 34 can contain photograph files and other data, including user shipping data and billing information. Also, the server 16 can print hard copy prints of digital photographs using a server printer 36, for shipping of the prints to a user of the user computer 12.

Figure 2:
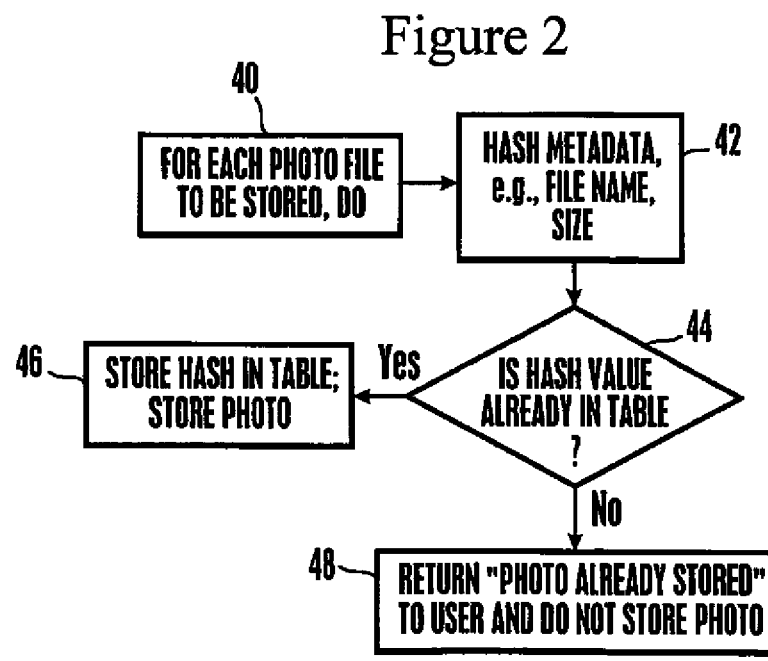
FIG. 2 is a flow chart of non-limiting logic that can be executed by the system shown in FIG. 1.

Now turning to FIG. 2, the present logic can be seen. Commencing at block 40, when, e.g., the removable memory 24 is engaged with the computer 12 for the purpose of automatically archiving photograph files generated by the camera 26 onto the local storage 22, for each photo file a do loop is entered. More generally, photos on one storage such as the removable memory 24 or other storage, including, e.g., the Internet server store 34 or other data store via wired or wireless connection, are sought to be archived onto the local data store 22.

The do loop proceeds to block 42 to obtain metadata of the file. In one non-limiting implementation, the data obtained is file name, file size, and other (or all of the above) EXIF data. In a particularly preferred implementation the file name, size, and other EXIF data are hashed.

Decision diamond 44 indicates that the metadata obtained at block 42 is compared to metadata in a table that is accessible to the processor 28 and that contains metadata of photo files that have already been stored on the local data store 22. When a hash is used, the table stores hash values, and at decision diamond 44 the processor 28 simply compares the hash obtained at block 42 with the values in the hash table. If no match is found, at block 46 the hash that was obtained at block 42 is added to the table and the photograph file is stored on the local data store 22. On the other hand, if the metadata of the photo file under test matches data in the table (e.g., if the hash from block 42 matches a hash in the table), the process flows from decision diamond 44 to block 48 wherein the photo file is not stored and, if desired, a message is returned to the user to the effect that "this photograph has already been stored." Further, if desired the process can erase redundant photo files from the removable memory 24.

While the particular SYSTEM AND METHOD FOR AUTOMATIC DETECTION OF DUPLICATE DIGITAL PHOTOS is herein shown and described in detail, it is to be understood that the subject matter which is encompassed by the present invention is limited only by the claims.

What is claimed is:

1. A method for storing, onto a first computer storage, digital photo files on a second computer storage, comprising:
   for at least one photo file representing a digital photograph on the second computer storage, accessing metadata information related to the file, the metadata information being established by a combination of at least one of exchangeable image file (EXIF) parameters, and a file size associated with the photo file;
   comparing a hash of the metadata information related to the with data in a data structure representing photo files that have been previously stored; and
   determining whether to store the photo file onto the first computer storage based at least in part on the comparing, wherein the photo file is stored onto the first computer storage responsive to the hash failing to match data in the data structure, such that duplicate photos are detected and failed to be copied onto the first computer storage.

2. The method of claim 1, wherein the determining is performed on all photo files on the second computer storage automatically and metadata or a hash thereof for each photo file is automatically compared to data in the data structure.

3. The method of claim 1, wherein a hash of metadata is compared to data in the data structure, and the data structure is a hash table.

4. The method of claim 3, wherein the hash is a hash of file name, file size, and predetermined EXIF data.

5. The method of claim 3, wherein responsive to the hash matching data in the data structure, the photo file is not copied onto the first computer storage.

6. The method of claim 5, wherein responsive to the hash not matching data in the data structure, the hash is added to the data structure.

7. An apparatus for storing digital photo files, comprising:
   at least a first computer storage; and
   at least one processor configured for accessing a second computer storage to configure the processor to:
   compare hash values of information associated with photo files representing digital photographs on the second computer storage with values in a data structure;
   determine whether to store each photo file onto the first computer storage at least partially based on the compare; and
   responsive to a determination that a first hash value of information associated with the first photo file matches a value in the data structure, generate a user-perceptible message or the apparatus that the first photo file has been previously stored.

8. The apparatus of claim 7, wherein the instructions when execute by the processor configure the processor for performing the determining on all photo files on the second computer storage automatically.

9. The apparatus of claim 8, wherein the hash value represents a hash of file name, file size, and predetermined EXIF data.

10. The apparatus of claim 7, wherein the instructions when executed by the processor configure the processor for not copying the photo file onto the first computer storage responsive to a determination that the first hash value of information associated with the first photo file matches a value in the data structure.

11. The apparatus of claim 10, wherein the instructions when executed by the processor configure the processor for copying the photo file onto the first computer storage responsive to a determination that the first bash value of information associated with the first photo file matches no value in the data structure.

12. A non-transitory computer readable storage medium bearing instructions executable by a computer processor to undertake logic comprising:
   comparing hashes of file size, and EXIF data of respective photographs against values in a data structure representing previously stored photographs on an archive data store to ensure that only previously unstored photos are copied onto the archive data store; and
   responsive to a determination that, based on the comparing of hashes of file size and EXIF data against the value in the data structure, redundant photo files exist in the archive data store, ensuring that duplicate photographs are not stored in the data store.

13. The computer readable storage medium of claim 12, wherein the instructions include cause the processor to hash file name, file size, and EXIF data of each digital photograph on the archive data store.

14. The computer readable storage medium of claim 12, wherein the instructions configure the processor not to copy, onto the archive computer storage, a digital photograph whose hash of information matches a value in the data structure.

15. The computer readable storage medium of claim 14, wherein the instructions configure the processor to copy, onto the archive computer storage, a digital photograph whose hash of information matches no value in the data structure.

* * * * *